(12) United States Patent
Yeh

(10) Patent No.: US 9,346,512 B2
(45) Date of Patent: May 24, 2016

(54) PROTECTIVE COVER

(71) Applicant: Ching-Ho Yeh, Taichung (TW)

(72) Inventor: Ching-Ho Yeh, Taichung (TW)

( * ) Notice: Subject to any disclaimer, the term of this patent is extended or adjusted under 35 U.S.C. 154(b) by 0 days.

(21) Appl. No.: 14/864,875

(22) Filed: Sep. 25, 2015

(65) Prior Publication Data

US 2016/0009330 A1 Jan. 14, 2016

(51) Int. Cl.
*B62K 5/06* (2006.01)
*B62K 3/00* (2006.01)
*B62K 5/00* (2013.01)

(52) U.S. Cl.
CPC . *B62K 5/06* (2013.01); *B62K 3/002* (2013.01); *B62K 5/00* (2013.01)

(58) Field of Classification Search
CPC ........ B62K 3/002; B62K 21/00; B62K 21/12; B62D 51/02
See application file for complete search history.

(56) References Cited

U.S. PATENT DOCUMENTS

| | | | | |
|---|---|---|---|---|
| 8,091,906 | B1* | 1/2012 | Chen | A63C 17/04 280/87.041 |
| 8,696,000 | B1* | 4/2014 | Chen | B62K 3/002 280/11.28 |
| 2002/0096855 | A1* | 7/2002 | Lee | B62M 1/16 280/244 |
| 2015/0035257 | A1* | 2/2015 | Zaid | B62K 3/002 280/641 |

* cited by examiner

*Primary Examiner* — Bryan Evans

(57) ABSTRACT

A kick scooter includes a steering tube; a deck including a support tube on a top at a front end, the support tube being pivotably secured to the steering tube, two bossed holes on an underside, two through holes in front of the bossed holes, a recess at the front end, and a mounting member disposed in the recess; an axle secured to the steering tube through the mounting member; a rear wheel rotatably connected to the deck; two front wheels rotatably connected to two ends of the axle respectively; and a protective cover including two first bossed holes on an underside and releasably secured to the bossed holes of the deck, two second bossed holes on the underside and releasably secured to the through holes of the deck, and a through hole with the support tube secured thereto. The protective cover is replaceable.

1 Claim, 5 Drawing Sheets

PROTECTIVE COVER

BACKGROUND OF THE INVENTION

1. Field of the Invention

The invention relates to kick scooters and more particularly to a replaceable member for covering a joining portion of a steering tube and a deck of a kick scooter.

2. Description of Related Art

Conventionally, a joining portion of a steering tube and a deck of a kick scooter is exposed. Dirt may enter the joining portion and accumulate therein. This can increase friction and cause malfunction. Thus, the need for improvement still exists.

SUMMARY OF THE INVENTION

It is therefore one object of the invention to provide a kick scooter comprising a steering tube; a deck including a support tube on a top at a front end, the support tube being pivotably secured to the steering tube, two bossed holes on an underside, two through holes in front of the bossed holes, a recess at the front end, and a mounting member disposed in the recess; an axle secured to the steering tube through the mounting member; a rear wheel rotatably connected to the deck; two front wheels rotatably connected to two ends of the axle respectively; and a protective cover including two first bossed holes on an underside and releasably secured to the bossed holes of the deck, two second bossed holes on the underside and releasably secured to the through holes of the deck, and a through hole with the support tube secured thereto.

The above and other objects, features and advantages of the invention will become apparent from the following detailed description taken with the accompanying drawings.

DETAILED DESCRIPTION OF THE INVENTION

Figure 1:
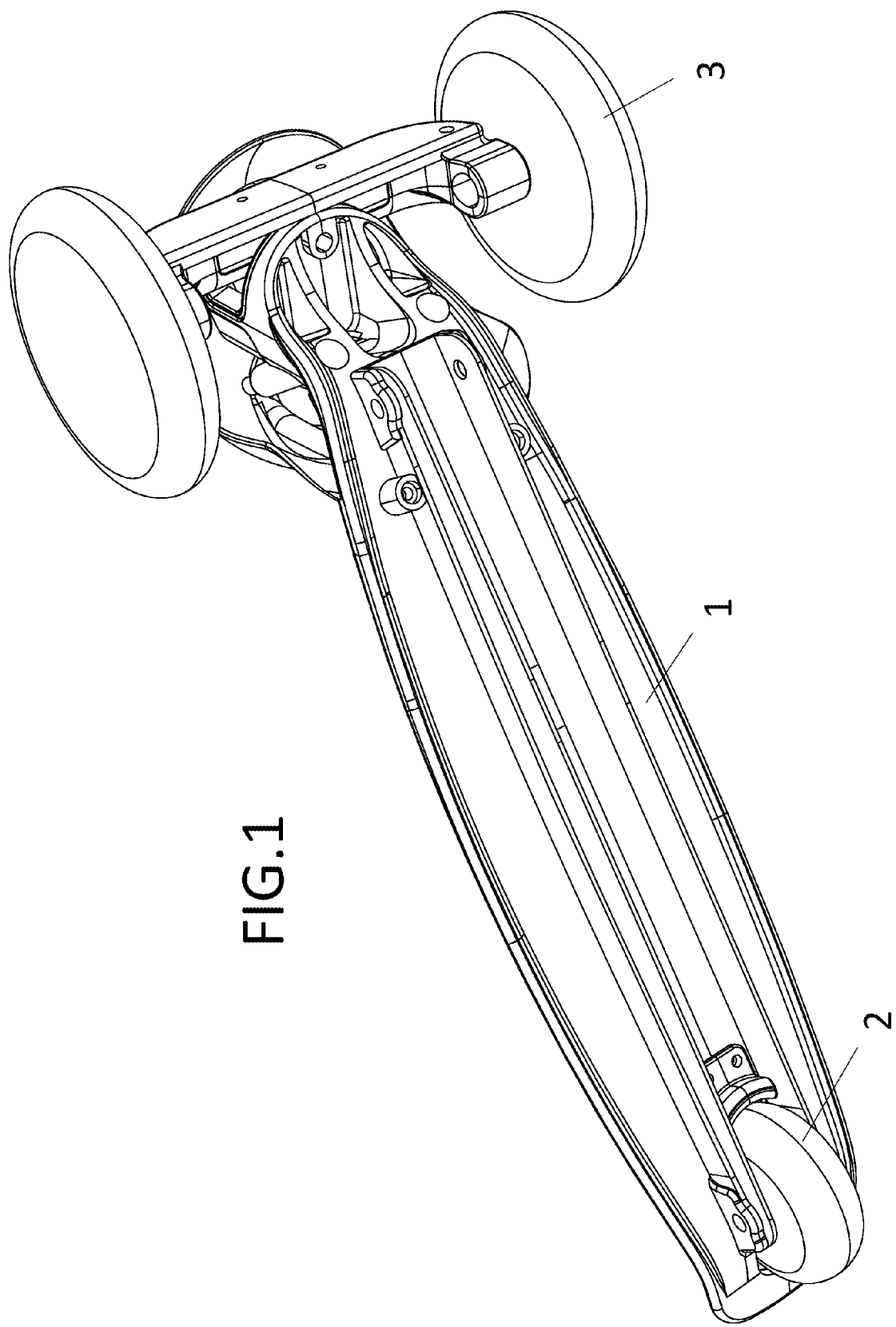
FIG. 1 is a perspective view of a kick scooter of the invention.
Figure 2:
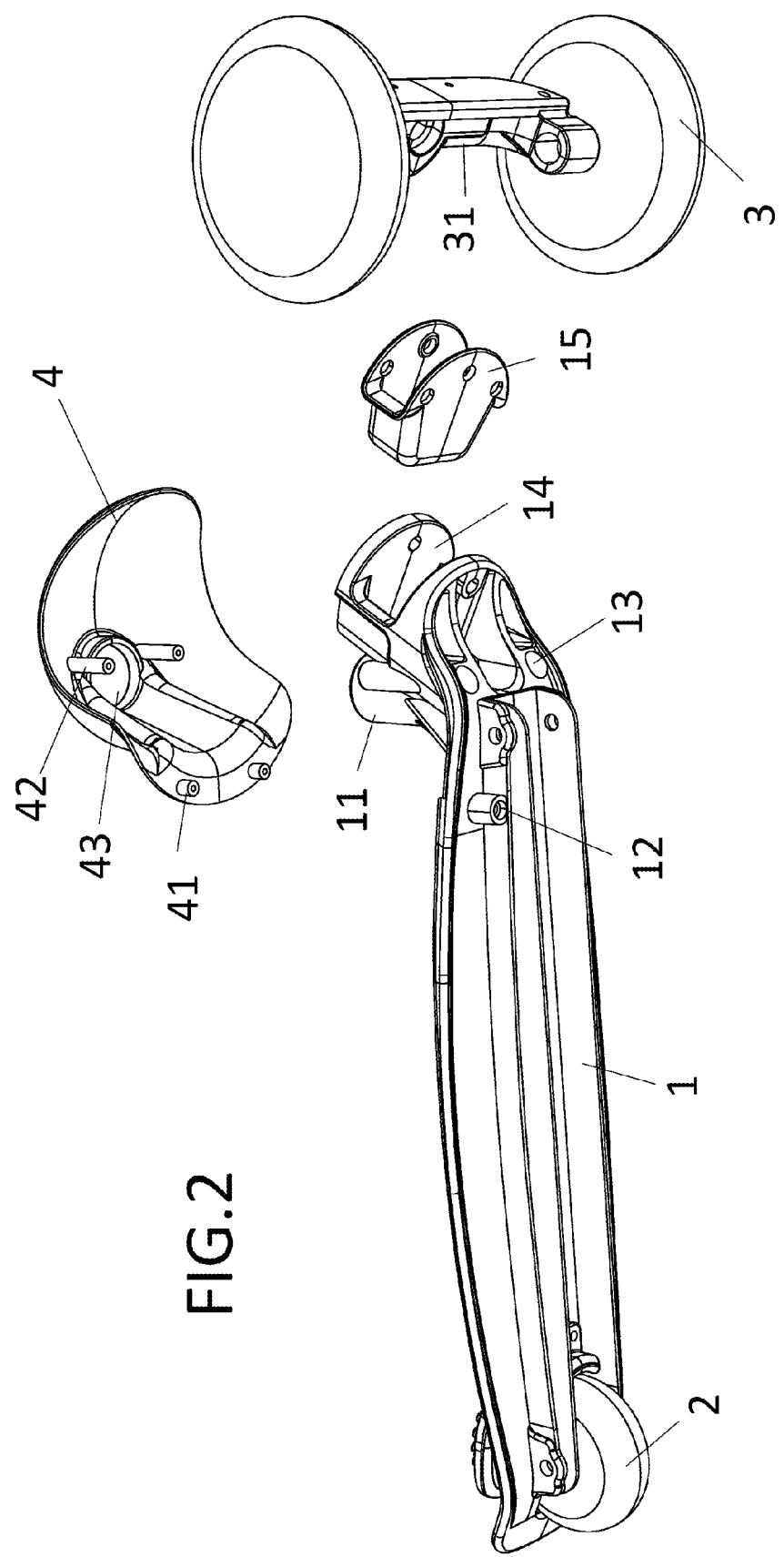
FIG. 2 is an exploded view of FIG. 1.
Figure 3:
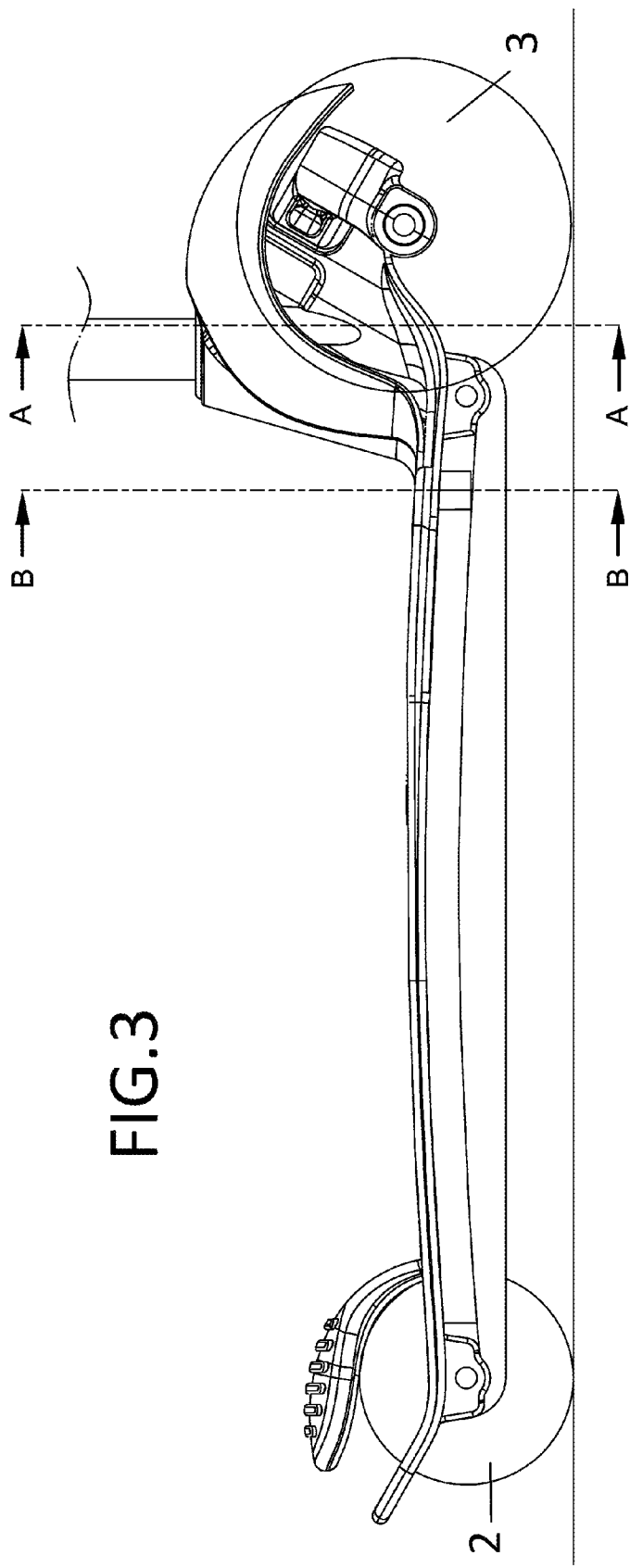
FIG. 3 is a side view of FIG. 1.
Figure 4:
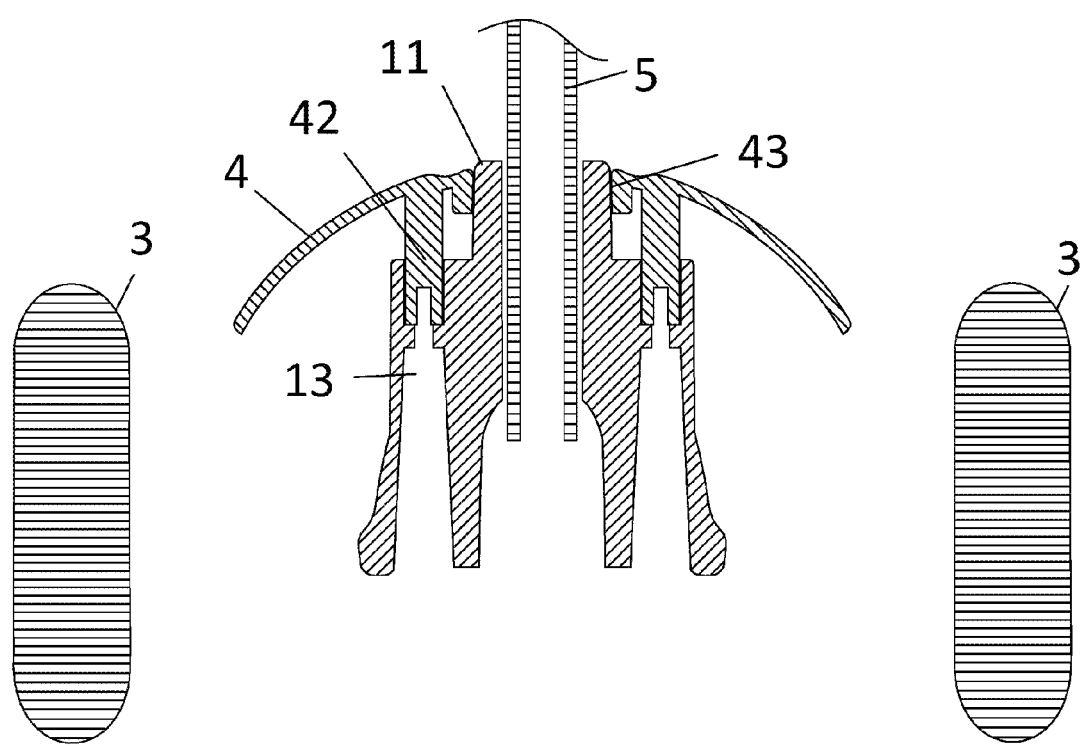
FIG. 4 is a sectional view taken along line A-A of FIG. 3.
Figure 5:
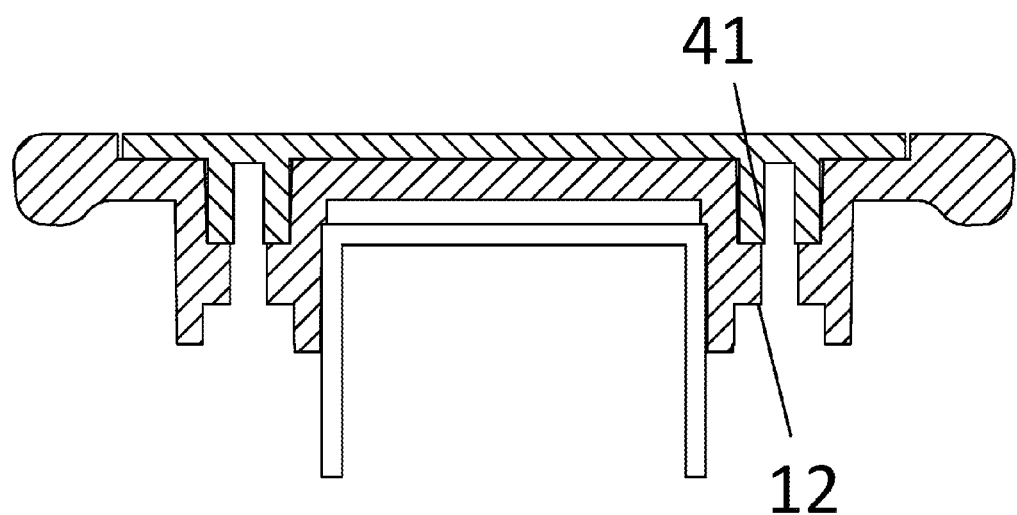
FIG. 5 is a sectional view taken along line B-B of FIG. 3.

Referring to FIGS. 1 to 5, a kick scooter of the invention comprises a deck 1 including a top support tube 11 at a front end with a lower portion of a steering tube 5 pivotably disposed therein, two bossed holes 12 on an underside, two through holes 13 in front of the bossed holes 12, a recess 14 at the front end, and a mounting member 15 disposed in the recess 14; a rear wheel 2 rotatably connected to the deck 1; two front wheels 3 rotatably connected to two ends of an axle 31 respectively; the axle 31 having an intermediate portion secured to the steering tube 5 through the mounting member 15 so that a rider may turn the front wheels 3 by turning a handlebar (not shown) secured to a top end of the steering tube 5; and a protective cover 4 including two first bossed holes 41 on an underside and releasably secured to the bossed holes 12, two second bossed holes 42 on the underside and releasably secured to the through holes 13, and a through hole 43 with the support tube 11 secured thereto.

It is envisaged by the invention that a joining portion of the steering tube 5 and the deck 1 is protected.

While the invention has been described in terms of preferred embodiments, those skilled in the art will recognize that the invention can be practiced with modifications within the spirit and scope of the appended claims.

What is claimed is:

1. A kick scooter comprising:

a steering tube;

a deck including a support tube on a top at a front end, the support tube being pivotably secured to the steering tube, two bossed holes on an underside, two through holes in front of the bossed holes, a recess at the front end, and a mounting member disposed in the recess;

an axle secured to the steering tube through the mounting member;

a rear wheel rotatably connected to the deck;

two front wheels rotatably connected to two ends of the axle respectively; and a protective cover including two first bossed holes on an underside and releasably secured to the bossed holes of the deck, two second bossed holes on the underside and releasably secured to the through holes of the deck, and a through hole with the support tube secured thereto.

* * * * *